(12) United States Patent
Harris

(10) Patent No.: US 8,043,996 B2
(45) Date of Patent: Oct. 25, 2011

(54) METHOD FOR TREATMENT OF UNDERGROUND RESERVOIRS

(75) Inventor: Ralph Edmund Harris, Guildford (GB)

(73) Assignee: Cleansorb Limited, Surrey (GB)

( * ) Notice: Subject to any disclaimer, the term of this patent is extended or adjusted under 35 U.S.C. 154(b) by 0 days.

(21) Appl. No.: 12/667,760

(22) PCT Filed: Jul. 3, 2008

(86) PCT No.: PCT/GB2008/002297
§ 371 (c)(1),
(2), (4) Date: Jan. 21, 2010

(87) PCT Pub. No.: WO2009/007689
PCT Pub. Date: Jan. 15, 2009

(65) Prior Publication Data
US 2010/0152069 A1    Jun. 17, 2010

(30) Foreign Application Priority Data
Jul. 6, 2007  (GB) .................................. 0713180.8

(51) Int. Cl.
*C09K 8/52* (2006.01)
*C09K 8/60* (2006.01)
*E21B 43/28* (2006.01)
*E21B 37/06* (2006.01)

(52) U.S. Cl. ....... 507/90; 166/304; 166/305.1; 166/307; 166/308.2; 166/308.3; 166/308.4; 175/65; 507/101; 507/201; 507/267; 507/902; 507/923; 507/933; 516/21; 516/53

(58) Field of Classification Search .................... 507/90, 507/101, 201, 267, 902, 923, 933; 166/304, 166/305.1, 307, 308.2, 308.3, 308.4; 175/65; 516/21, 53

See application file for complete search history.

(56) References Cited

U.S. PATENT DOCUMENTS

| | | | |
|---|---|---|---|
| 3,682,249 | A | 8/1972 | Fischer et al. |
| 3,783,945 | A | 1/1974 | Dauben et al. |
| 3,799,265 | A | 3/1974 | Webb |
| 6,220,352 | B1 | 4/2001 | Walton |
| 7,833,943 | B2 | 11/2010 | Van Zanten et al. |
| 2003/0114318 | A1 * | 6/2003 | Benton et al. ............... 507/200 |
| 2003/0166472 | A1 | 9/2003 | Pursley et al. |
| 2006/0096757 | A1 | 5/2006 | Berry et al. |
| 2007/0032386 | A1 | 2/2007 | Abad et al. |
| 2007/0295368 | A1 | 12/2007 | Harrison et al. |
| 2008/0006410 | A1 * | 1/2008 | Looney et al. ............. 166/308.4 |
| 2008/0296222 | A1 | 12/2008 | Harrison et al. |
| 2010/0081587 | A1 | 4/2010 | Van Zanten et al. |

FOREIGN PATENT DOCUMENTS

WO   WO 2006/051255 A1 *   5/2006
WO   WO 2010/034965         4/2010

OTHER PUBLICATIONS

UK Search Report in GB0713180.8 dated Oct. 11, 2007.
International Search Report for PCT/GB2008/002297, mailed Oct. 23, 2008.
Written Opinion of the International Searching Authority for PCT/GB2008/002297, mailed Oct. 23, 2008.

* cited by examiner

*Primary Examiner* — Timothy J. Kugel
(74) *Attorney, Agent, or Firm* — Nixon & Vanderhye P.C.

(57) ABSTRACT

A process is disclosed for treating an underground formation, which process comprises: (a) introducing into the underground formation a micellar dispersion comprising water, one or more organic acid precursors, one or more surfactants and, optionally, one or more salts, co-surfactants and/or organic liquids that are not organic acid precursors; and (b) allowing (i) the micellar dispersion to solubilize hydrocarbons, emulsions or water blocks present in the underground formation, and (ii) at least a portion of the organic acid precursor to hydrolyze in-situ to produce sufficient organic acid to substantively dissolve acid soluble material present in or adjacent to filter cakes or other damage in the underground formation.

25 Claims, No Drawings

METHOD FOR TREATMENT OF UNDERGROUND RESERVOIRS

This application is the U.S. national phase of International Application No. PCT/GB2008/002297 filed 3 Jul. 2008, which designated the U.S. and claims priority to UK Application No. GB 002297, filed 3 Jul. 2008, the entire contents of each of which are hereby incorporated by reference.

The present invention relates to the production of oil, gas or water from wells drilled into underground reservoirs. It is also applicable to injection wells.

During drilling, completion, workover and production operations there are numerous situations where the production or injection rate of an oil, gas or water well following these operations is limited or impaired due to the presence of formation damage. Types of damage include, but are not limited to, the presence of invert emulsion filter cakes, filter cakes from use of water-based muds, fluids filtrates or residues (including from hydraulic fracturing fluids, and gravel packing fluids) particulate materials such as fluid loss control agents and weighting agents, rock fines, biofilms, scales, emulsions, "water blocks" and hydrocarbon accumulations, including but not being limited to asphaltenes, waxes and paraffins.

Damage can be near wellbore, for example the presence of filter cake, or damage may be present deeper into the formation, for example in natural or induced fractures or in the rock matrix. The effective removal of damage, especially near wellbore damage such as filter cake, can significantly increase the production rate of hydrocarbon or water producing wells penetrating underground formations. It may also reduce the risk of failure of sand control completions. The effective removal of damage can also increase the injectivity of injection wells.

Hydrocarbons or emulsions present in the wellbore, near wellbore region or deeper into the formation may be highly damaging. Hydrocarbons or emulsions may also coat acid soluble materials and limit the effectiveness of treatments such as acidizing or the use of chelating agents intended to dissolve acid soluble components of damage. Such acid-soluble components include components such as calcium carbonate present in filter cakes produced from drilling with oil-based drilling muds or drill-in fluids.

Examples of such drill-in fluids include invert emulsion drill-in fluids or muds and synthetic oil based drill-in fluids including ester based drill-in fluids. Also included are high biodegradability drill-in fluids. Hydrocarbons may also coat acid-soluble components of filter cakes produced from drilling with water based drill-in fluids. Conventional acidizing formulations typically include low concentrations of suitable surfactants to water wet the surfaces of acid-soluble materials to facilitate their dissolution.

Hydrocarbons may also coat acid-soluble scales present in the wellbore, formation or tubulars. Often there are alternating layers of scale, hydrocarbons and/or paraffins.

The use of micellar dispersions, also known as "transparent emulsions", "micellar solutions" or "microemulsions" for well treatments has been previously taught. Use of micellar dispersions to solubilise hydrocarbons, remediate drilling mud damage, increase production or injection rates of wells and treat emulsions and water blocks has been taught. Use of micellar dispersions when perforating, or as a fluid ahead of acidizing treatments has also been taught.

U.S. Pat. No. 2,356,205 teaches use of transparent emulsions to increase the productivity of subterranean oil bearing strata. It states that the transparent emulsions are solvents for both organic deposits and water or aqueous brine. U.S. Pat. No. 2,356,205 indicates that the non-polar solvent component acts as a solvent for hydrocarbon or paraffin and that the major portion of the non-polar solvent can pass from the transparent emulsion into the wax or paraffin, causing it to swell and soften and instigating initial disruption. Waxy or oily deposits may just consist of an absorbed film and the transparent emulsion may render such oil wet surfaces water wet, thereby increasing productivity. The patent explicitly states that "The process herein contemplated is particularly adaptable to the removal of infiltrated drilling mud barriers". U.S. Pat. No. 2,356,205 also teaches that compounds such as n-butyl lactate or alpha-terpineol may be used as the semi-polar liquid used as a "common solvent". Similar teaching is found in U.S. Pat. No. 2,356,254.

U.S. Pat. No. 3,474,865 teaches the use of water external micellar dispersions to increase the injectivity of injection wells. The specification indicates that the micellar dispersions are miscible with both crude oil and formation water. It postulates that the dispersion reduces the residual hydrocarbon saturation in sand pores immediately adjacent to the well bore and reduces "skin damage".

U.S. Pat. No. 3,493,048 teaches that micellar dispersions, used to sweep oil from an injector well towards a producer well may have their thermal stability shifted to higher temperature ranges by increasing the concentration of alcohol co-surfactant within the micellar dispersion.

U.S. Pat. No. 3,554,288 teaches that "water blockage" in gas wells may be removed by injecting into the wellbore a sufficient amount of a micellar solution to "solubilise" the water and facilitate the flow of hydrocarbon towards the well bore. A continuation in part of U.S. Pat. No. 3,554,288 is U.S. Pat. No. 3,653,442.

U.S. Pat. No. 3,554,289 teaches that a water and hydrocarbon emulsion blockage around a well bore can be removed using a micellar dispersion to "solubilize" the emulsion. The micellar dispersion can be oil-external or water-external. Continuations in part of U.S. Pat. No. 3,554,289 are U.S. Pat. Nos. 3,684,015; 3,771,602; 3,799,265.

U.S. Pat. No. 3,568,772 teaches the use of a micellar dispersion ahead of an acid treatment to increase the injectivity of an injection well.

U.S. Pat. No. 3,661,210 teaches the injection of a micellar dispersion followed by the injection of gas to improve the injectivity and productivity of subterranean reservoirs used to store hydrocarbon.

U.S. Pat. No. 3,754,599 teaches perforating in a micellar dispersion, where the micellar dispersion tends to clean the perforations, solubilize mud filtrates etc, which were deposited during the initial drilling of the well. Where water sensitive reservoirs are perforated, an oil-external dispersion is used since it is compatible with such reservoirs.

U.S. Pat. No. 3,831,679 teaches a microemulsion consisting of a hydrocarbon external phase and an acid internal phase, as an inhibited acidizing fluid, particularly suitable for acidizing carbonate formations.

US 2003/0166472A1 teaches a well treatment microemulsion used to deliver acids during acidizing operations, where the microemulsion includes about 3% to 28% by volume of a mineral or organic acid.

US2006/0096757 A1 teaches biodegradeable microemulsion systems for well treatment, wherein some hydrolysis of a lactic acid ester may be used to lower the pH and either reduce the viscosity of pH sensitive cross-linked gels or activate an enzyme or other gel breaker to reduce the viscosity of a fracturing fluid or gelled fluid system. US2006/0096757A1 also teaches that the microemulsions may further contain a sufficient amount of a relatively strong acid to lower the pH of the fluid system to about 4 or less, preferably to about 2 or less to about 3 or less, and most preferably to about 1 or less. Relatively strong acids include, but are not necessarily limited to, phosphoric acid, hydrochloric acid, sulfuric acid, nitric acid, and the like. A preferred acid is phosphoric acid. US2006/0096757 A1 further teaches that the well treatment fluid system can also be used to deliver acids during acidizing operations. Acids commonly used include hydrochloric, acetic, formic, and hydrochloric-hydrofluoric acids.

U.S. Pat. No. 7,134,496 teaches that microemulsions used for well treatment may contain chelating agents or salts of chelating agents such that solubilisation of susceptible bridging particles in invert emulsion filter cakes may be achieved. U.S. Pat. No. 7,134,496 also teaches that the microemulsions may incorporate an acid selected from inorganic acids such as hydrochloric acid or sulphuric acid, or organic acids such as acetic acid or formic acid.

The prior teaching indicates that suitable micellar dispersions may be used in a number of types of underground formation treatments. They may be used to remediate a number of different types of hydrocarbon, emulsion or water block damage or enhance the effectiveness of treatments such as acidizing or perforating. When used ahead of or in conjunction with acidizing treatments they facilitate the water wetting of acid-soluble materials allowing the successful acidizing of such materials.

There are a number of damage removal situations where formation damage has more than one component. For example filter cakes arising from drilling wells with water based, carbonate weighted drill-in fluids contain polymers such as starch, xanthan and cellulose as well as acid-soluble particulate materials including but not being limited to calcium carbonate or dolomite. Previous treatments have required the use of two stages, such as an enzyme or oxidising agent soak to hydrolyse the polymers, followed by a separate acid treatment to dissolve calcium carbonate. Single stage treatments are now available, which can treat both the polymer and the acid soluble material in the filter cake. Examples include; enzymes plus buffered acid; enzymes plus chelating agents; ester plus an enzyme or oxidizing agent.

In some situations where micellar dispersions are used to treat formation damage, such as to solubilise hydrocarbons, remediate drilling mud damage, increase production or injection rates of wells and treat emulsions and water blocks it would be useful for the micellar dispersions to also be capable of dissolving acid soluble material enabling a single stage treatment. For example, many oil-based drill-in fluids including invert emulsion drill in fluids and synthetic oil based drill-in fluids contain acid soluble particulate material such as calcium carbonate as a weighting or fluid loss agent. Another situation is where hydrocarbons coat acid soluble material in filter cakes produced from drilling with water based drill-in fluids or acid-soluble material in scales.

The prior art has indicated that use of a micellar dispersion followed by acidizing may be used to treat more than one component of formation damage i.e. as a two stage treatment. Single stage treatments comprising micellar dispersions combined with either a mineral or organic acid have also been taught by the prior art. Such dispersions will achieve the dissolution of acid-soluble material coincident with treating of hydrocarbon, emulsion or water block damage. However, the rapid reaction rate of the acid may significantly limit the practical application of such formulations in long openhole situations where good zonal coverage is required, as premature and uneven leak-off may occur during placement, particularly at higher formation temperatures. Acids incorporated directly into treatment fluids are generally hazardous in use and corrosion inhibitors may be required to minimise corrosion of downhole completions tools and equipment.

Similarly, the prior art also teaches that micellar dispersions may be combined with chelating agents or salts of chelating agents to dissolve components such as calcium carbonate that are soluble in solutions of chelating agents. The reaction rate of chelating agents with calcium carbonate or similar particulates may also be too rapid to allow good zonal coverage. Certain types of chelating agent may degrade only slowly in the environment, particularly when they are complexed to metal ions, so may present disposal issues.

There is a need for improved treatment formulations comprised of micellar dispersions which are effective for removing hydrocarbon, emulsion or water block damage but which will also deliver acid at a controlled rate for substantive dissolution of acid soluble material present in or adjacent to the damage. Ideally such treatment formulations would be provided in a single treatment fluid and give good zonal coverage.

In particular, there is a need for improved simple and effective processes to treat filter cakes arising from drilling with oil-based or invert emulsion drill-in fluids containing calcium carbonate (or other acid-soluble material) as a weighting and/or fluid loss agent. There is also a need for simple and effective processes to treat acid soluble scales containing significant amounts of hydrocarbons and or paraffins.

It is an object of the present invention to provide a simple and effective method for treating formation damage within an underground reservoir where the damage consists of damage such as hydrocarbon, emulsion or water block remediable by a micellar dispersion but which also provides, within a single stage treatment, the controlled rate dissolution of acid soluble materials.

It is a particular object of the present invention to provide simple and effective methods for the effective removal of filter cakes over long horizontal intervals and in sand control completions including gravel packs, stand alone and expandable screens.

Another object of the present invention is to provide single stage treatment methods which can remove damage and provide further stimulation of the production or injection rate by increasing the matrix permeability of adjacent regions of the formation including natural or induced fractures.

It is a further object of the present invention to provide methods which are environmentally acceptable by utilising, in at least some embodiments, components which are of low environmental impact and of low hazard to operatives.

Accordingly, the present invention provides a process for treating an underground formation, which process comprises:
(a) introducing into the underground formation a micellar dispersion comprising water, one or more organic acid precursors, one or more surfactants and, optionally, one or more salts, co-surfactants and/or organic liquids that are not organic acid precursors; and
(b) allowing (i) the micellar dispersion to solubilise hydrocarbons, emulsions or water blocks present in the underground formation, and (ii) at least a portion of the organic acid precursor to hydrolyse in-situ to produce sufficient organic acid to substantively dissolve acid soluble material present in or adjacent to filter cakes or other damage in the underground formation.

The formation may comprise a hydrocarbon reservoir, for instance a gas or oil reservoir. Alternatively the formation may comprise a water reservoir.

A micellar dispersion comprises at least three components: a polar phase (normally water); a non-polar phase (organic, frequently referred to as "oil"); and a surfactant.

The micellar dispersions of the present invention contain one or more organic acid precursors. They are thermodynamically stable micellar dispersions stable at ambient conditions and preferably, though not essentially, stable under formation conditions, in both the unspent and spent form. For the avoidance of doubt the micellar dispersions of the present invention may exist as microemulsions. A microemulsion is defined as a system of polar phase, non-polar phase and amphiphile (surfactant) which is a single phase optically isotropic and thermodynamically stable liquid solution.

The work of Winsor through the 1950s produced a classification system for various single and multiple phase microemulsion systems. The micellar dispersions of the present invention will normally exist as a single phase (Winsor IV microemulsion). Alternatively the system may exist as a multi-phase microemulsion. The multiple phase systems contain at least one phase that exists as a microemulsion system. Winsor I systems consist of an oil-in-water (O/W) microemulsion in equilibrium with an excess oil phase. Winsor II systems consist of a water-in-oil (W/O) microemulsion in equilibrium with an excess water phase. Winsor III microemulsion systems are typically 3 phase systems. They consist of a middle (bicontinuous) phase which usually comprises oil and water in roughly equal proportions and which also contains most of the surfactant, an excess upper (oil) phase and an excess lower (water) phase.

It will be understood by those skilled in the art that the use of particular ratios of suitable selected components will result in the spontaneous formation of a micellar dispersion. This differs from regular emulsions which are not thermodynamically stable and require the input of mechanical energy such as shaking, stirring, treating with ultrasound or shearing to generate the emulsion.

The micellar dispersion may be an "oil-in-water" (O/W) micellar dispersion or a "water-in oil" (W/O) micellar dispersion. The type of dispersion to be used will be selected according to the specific requirements of the treatment and will be apparent to those in the art of micellar dispersions and their applications. For example, U.S. Pat. No. 3,554,289 teaches that where an emulsion blockage is oil-external it is preferred to use an oil-external micellar dispersion and where the emulsion blockage is water-external a water-external micellar dispersion can be effectively used. There may however be occasions where either water-external or oil-external micellar dispersion may both be effective on a particular type of damage. In addition the microemulsion type used may be bi-continuous in nature.

It is well understood by those skilled in the art of preparing micellar dispersions that the presence of salts or other water soluble solutes including organic solutes, for example sugars and alcohols, will influence their formation. Also, the temperature range in which the micellar dispersion is stable will be affected by the specific composition of the micellar dispersion. For example, U.S. Pat. No. 3,493,048 has taught that increasing the concentration of alcohol co-surfactant within the micellar dispersion shifts their thermal stability shifted to higher temperature ranges. The thermal stability range of the micellar dispersion including the spent form will generally be taken into account when designing treatments. If phase separation is expected to occur, this may be acceptable as long as the micellar dispersion has first remediated the damage intended to be remediated, as long as phase separation does not result in equivalent or worse damage.

The aqueous or polar phase of the micellar dispersion may comprise water including fresh, tap (city or drinking water), river or surface water, sea water or oilfield brines. It may also comprise one or more water miscible compounds or solvents. Examples of suitable compounds or solvents include but are not limited to alcohols, polyols, ethers and glycols, such as methanol, ethanol, n-propanol, isopropanol, n-butanol, isobutanol, tert-butanol, butyl monoglycol ether, butyl diglycol ether, butyl triglycol ether, ethylene glycol monobutyl ether, ethylene glycol, diglycerol and polyglycerol. The polar phase may also comprise water soluble organic acid precursors. Generally any water miscible compounds will also be biodegradable to an acceptable extent.

The presence of water miscible solvent in the aqueous phase is believed to stabilise micellar dispersions so that less surfactant is required to form the micellar dispersion (U.S. Pat. No. 6,581,687). Water miscible compounds or solvents may also act as cosurfactants. U.S. Pat. No. 3,568,772 lists alcohols, amides, amino compounds, esters, aldehydes ketones and like materials, containing from 1 to about 20 carbon atoms, preferably from about 3 to about 16 carbon atoms, with alcohols being preferred.

Surfactants suitable for use in the process of the present invention will be any surfactant which may be incorporated into micellar dispersions containing organic acid precursors. One or more surfactants may be used. Suitable surfactants include non-ionic, anionic, cationic or amphoteric surfactants. Examples of suitable nonionic surfactants include, but are not limited to, alkyl polyglycosides, sorbitan esters, methyl glucoside esters, or alcohol ethoxylates. Suitable cationic surfactants include, but are not limited to, arginine methyl esters, alkanolamines and alkylenediamides. Suitable anionic surfactants include, but are not limited to alkali metal alkyl sulphates, alkyl ether sulfonates, alkyl sulfonate, branched ether sulfonates, alkyl disulfonate, alkyl disulphate, alkyl sulfosuccinate, alkyl ether sulphate, or branched ether sulphates, such as those described in GB 2,347,682 A. Readily biodegradable surfactants may also be used.

It will be understood by those skilled in the art of formulating micellar dispersions that not all surfactants may be suitable but that by varying the type and amounts of surfactant, organic acid precursor, water and other components a variety of micellar dispersions useful for the process of the present invention may be formulated.

The non polar phase of the micellar dispersion may comprise one or more non polar liquids. These may be selected from the group consisting of hydrocarbon fractions including diesel, kerosene, jet fuel or crude oil, synthetic base and mineral oils, ester fluids including esters of vegetable oils (such as corn, sunflower, rapeseed, palm, soy etc.), paraffins, isomerised olefins or terpenes, such as d-limonene or alpha terpineol. The non polar phase may also comprise organic acid precursors. Generally the organic acid precursor will also be biodegradable to an acceptable extent.

The cited prior art gives examples of other chemicals suitable for incorporation into micellar dispersions as a polar phase, non-polar phase surfactant or co-surfactant. For example PCT/GB2005/004012 lists many suitable surfactants and organic phases.

Depending on the specific composition of the micellar dispersion the organic acid precursor may function as polar or non-polar constituents of the micellar dispersion. They may also function as surfactants or co-surfactants.

It will be understood that one or more organic acid precursor may be present in the external or internal phase of the micellar dispersion or partitioned between the phases. It is necessary that at least a portion of the organic acid precursor may come into contact with sufficient water to be hydrolysed to produce a water soluble organic acid which can then dissolve acid soluble material.

Minimally, micellar dispersions of the present invention will contain water, surfactant and an organic acid precursor.

Organic acid precursors suitable for use in the process of the present invention will be any organic acid precursor which may be incorporated into micellar dispersions in an amount sufficient to produce sufficient organic acid to substantively dissolve acid soluble material present in or adjacent to filter cakes or other damage in the underground formation.

It will be understood by those skilled in the art of formulating micellar dispersions that not all organic acid precursors may be suitable but that by varying the type and amounts of surfactant, organic acid precursor, water and other components a variety of micellar dispersions useful for the process of the present invention may be formulated.

Organic acid precursors useful in the process of the present invention may include esters, orthoesters, anhydrides and polyesters and polyorthoesters. The organic acid precursor will hydrolyse at a predictable rate in the presence of even a small amount of water to generate an organic acid. The organic acid precursors will preferably be low hazard and toxicity with a high flash point and high environmental acceptability. Generally they will also be biodegradable to an acceptable extent.

Preferably the organic acid precursor is an ester, most preferably an ester of a carboxylic or hydroxycarboxylic acid. Esters taught in U.S. Pat. Nos. 5,678,632, 5,813,466, 6,702,023 and 6,763,888 are suitable for use in micellar dispersions of the present invention. They include esters of an aliphatic carboxylic acid of formula $RCO_2H$ wherein R is selected from the group consisting of hydrogen, an alkyl group having from 1 to 6 carbon atoms and —R'—$CO_2H$ where R' is a bond or an alkylene group having from 1 to 6 carbon atoms, the alkyl or alkylene group being unsubstituted or substituted by halogen or hydroxy.

Esters of short chain carboxylic acids including ethanoic and methanoic acid (acetic and formic acid) are particularly suitable. The calcium and magnesium salts of these acids have good solubility in water. Esters of hydroxycarboxylic acids such as glycolic and lactic acid are also particularly suitable. For example hydroxyacetic acid can dissolve calcium sulphate.

Where the acid has a hydroxy substituent, the ester may be a cyclic ester such as a lactone. Esters of chelating compounds such as malonic acid, oxalic acid, succinic acid, ethylenediaminetetraacetic acid (EDTA) nitriloacetic (NTA) citric acid or hydroxyacetic acid as taught in U.S. Pat. Nos. 6,702,023 and 6,763,888 may also be used. If a base is present and the chelating acid is neutralised, it will be understood that salts of such chelating acids may also act as dissolving agents for acid soluble materials as taught in U.S. Pat. No. 7,021,377. Where acid soluble materials are described in the current description, this also refers to material soluble in solutions of salts of chelating acids and agents.

The alcohol portion of the ester may be monohydric or polyhydric. The degree of esterification of polyhydric alcohols will affect the solubility of the ester in water and hydrocarbons. For example, partial esters of polyhydric alcohols can be used in which case the unesterified hydroxyl groups serve to increase the water solubility of the ester, compared to fully esterified polyhydric alcohols.

Suitable esters include but are not limited to ethylene glycol monoformate, diethylene glycol diformate, glycerol monoformate, glycerol triacetate, glycerol diacetate, butyl lactate, propyl lactate and ethyl lactate.

Organic acids produced from the hydrolysis of the organic acid precursor which are useful in the method of the present invention include any organic acid which reacts with acid soluble materials downhole to produce salts of sufficient solubility to ensure substantive dissolution of the acid soluble materials takes place, for example calcium formate or calcium lactate. Normally the salt is soluble in the aqueous or polar phase of the micellar dispersion.

It will be understood that while the micellar dispersions of the present invention will normally be present as a single phase when introduced into the underground formation, changes in one or more of (a) temperature and pressure (b) pH, salt concentration and ionic strength resulting from the hydrolysis of at least a portion of the acid precursor (c) dissolution of acid-soluble material and (d) solubilisation of hydrocarbons or other material made soluble by the micellar dispersion, may cause phase separation of the treatment fluid as it spends. For example spent treatment fluid may be present as Winsor I, II or III microemulsion systems If the micellar dispersion undergoes phase separation as a result of increase in temperature or the changes resulting from hydrolysis of the organic acid precursor, then the salt would normally still be soluble in the aqueous phase following phase separation. However, it will be understood that there may be some situations where the metal complexes of chelating acids or their salts produced from certain organic acid precursors may be significantly soluble in the non-polar phase of the micellar dispersion or the non polar phase produced by phase separation. It is important that the acid soluble material dissolved by the treatment is not re-deposited in another solid or other form that produces a different type of damage.

Sufficient organic acid precursor (or precursors) are present in the micellar dispersion to produce sufficient acid, when the organic acid precursor is hydrolysed for the acid produced to have a substantive effect on acid soluble material present in or adjacent to filter cakes or other types of damage. By substantive effect it is meant that sufficient acid is produced on the hydrolysis of the organic acid precursor to give sufficient dissolution of acid soluble material, present in or adjacent to the filter cake, scale or other damage, to assist in the removal of damage or to increase the permeability of carbonate rock formations.

Examples of situations where the dissolution of acid soluble material is desirable include the dissolution of carbonate present in a filter cake produced from a water-based or oil-based drill-in fluid, the dissolution of carbonate rock adjacent to a filter cake, the dissolution of carbonate rock adjacent to induced or natural fractures and the dissolution of carbonate scales in the wellbore, formation or tubulars.

The micellar dispersions of the present invention may also be used to increase the permeability of an acid soluble rock matrix adjacent to a wellbore, natural or induced fracture.

To obtain sufficient dissolution, it is necessary that a minimum of several percent w/v of acid is produced. The concentration of organic acid precursor incorporated into the micellar dispersion of the present invention will typically be at least 1% w/v but may be up to 20% w/v or higher.

Preferably the organic acid produced from hydrolysis of the organic acid precursor should be water soluble to at least 1% w/v.

The micellar dispersions of the present invention act to solubilise hydrocarbons, emulsions and water blocks relatively quickly, generally in hours. Typically shut-in periods of between 0.5 hours and 24 hours will be employed to achieve solubilisation, although longer or shorter treatment periods may also be used. Solubilisation of hydrocarbons from surfaces such as particles in oil based mud filter cakes may only require a few minutes. Without wishing to be bound by theory, it is likely that a number of mechanisms are at work, including solvent effects on hydrocarbon, micro emulsification of hydrocarbon components into the aqueous phase and water wetting of the underlying solid surfaces through surfactant/detergent action.

Ideally, acid production from the organic acid precursor and dissolution of acid soluble material will occur over a similar timescale of between 0.5 and 24 hours although longer or shorter treatment times may also be used. Generally it is desirable to treat the well over a period which is long enough to allow good zonal coverage but is not so long that the costs to the operator, such as rig time, are unduly increased. In some situations such as a filter cake treatment in a well which has been drilled but which is to be shut in for weeks or months before being put on production, treatment over a long period may be acceptable.

In the simplest case, the organic acid precursor will hydrolyse at a suitable rate in the absence of any catalyst. Where the rate of hydrolysis is not sufficient, it is desirable to incorporate a catalyst into the micellar dispersion to increase the rate of acid production.

Suitable catalysts for increasing the rate of hydrolysis of organic acid precursors include enzymes, non-enzyme catalysts and salts of a carboxylic acid. It is not outside the scope of the present invention that certain surfactants may act as catalysts for hydrolysis of the organic acid precursors.

Enzymes suitable for incorporation into the micellar dispersions of the present invention include those taught in U.S. Pat. Nos. 5,678,632, 6,702,023 and 6,763,888 including lipases, esterases and proteases. Non-enzyme catalysts suitable for incorporation into the micellar dispersions of the present invention have been taught in U.S. Pat. No. 6,702,023. Where an enzyme is used, it is necessary to select an enzyme which remains active under reservoir conditions and in the treatment fluid for at least as long as the catalytic activity is needed. Typically, isolated enzymes are used. Enzymes may be isolated from plant, animal, bacterial or fungal sources. The enzymes may be produced from wild-type, conventionally bred, mutated or genetically engineered organisms. The enzymes may, optionally, be chemically modified, as long as they retain or possess the desired catalytic ability. Preferably, the enzymes will be industrial enzymes available in bulk from commercial sources.

Non-enzyme catalysts taught included metal ions such as transition metal ions, organic molecules including amino acids, peptides, monosaccharides, oligosaccharides, nucleic acids, peptide nucleic acids and derivatives of organic molecules and combinations thereof. The use of Salts of carboxylic acids to increase the rate of hydrolysis of organic acid precursors has been taught in WO04007905A1. Useful salts include salts of an aliphatic carboxylic acid of formula RCO2H wherein R is selected from hydrogen, an alkyl group having from 1 to 6 carbon atoms and R'—CO:H wherein R' is a bond or an alkylene group having from 1 to 6 carbon atoms, the said alkyl or alkylene group being branched or unbranched and unsubstituted or substituted A number of lipases have their activity enhanced and/or are significantly stabilised when present in micellar dispersions. Without wishing to be bound by theory, it is believed that such enzymes usually operate at interfaces and the micellar dispersion provides more optimum conditions for their function and stability than a bulk aqueous or organic phase. A consequence of this is that lower concentrations of enzyme may be required in a micellar dispersion to achieve the same rate of hydrolysis of organic acid precursor, compared to aqueous systems. For certain non-enzyme catalysts, such as organometallic enzyme mimics, similar enhancement of activity or stabilisation may be expected when used in a micellar dispersion.

The chemicals required for the process of the present invention will normally be technical grade to reduce the cost of the process.

The simplest micellar dispersions useful for the present invention are comprised of water, one surfactant and one organic acid precursor. The micellar dispersion solubilises hydrocarbons, emulsions and water blocks susceptible to treatment by the micellar dispersion and at least a portion of the organic acid precursor is hydrolysed to produce sufficient organic acid to substantively dissolve acid soluble material present in or adjacent to filter cakes or other damage in the underground formation.

For example a simple micellar dispersion useful in the process of the present invention may be comprised of water, surfactant and butyl lactate. Such a combination is described in WO 2006/051255 for use as a cleaning composition. By allowing sufficient hydrolysis of the butyl lactate to lactic acid to occur, substantive acidizing of acid soluble material may also be obtained according to the process of the present invention. Because butyl lactate hydrolyses at a relatively slow rate at lower temperatures, such as below 80 degrees C., it would normally be necessary to incorporate a catalyst, preferably an enzyme into the micellar dispersion to allow lactic acid production at a useful rate.

Generally at least a portion of the organic acid precursor will partition into or reside in the polar phase which will contain at least the amount of water needed to hydrolyse the organic acid precursor and dissolve the products of the organic acid reaction with the acid soluble material.

More complex micellar dispersions useful in the process of the present invention may employ more than one surfactant, polar solvent or organic acid precursor and may also incorporate a non-polar compound that is not an organic acid precursor but which facilitates micellar dispersion formation. They may also incorporate salts or co-surfactants.

The micellar dispersion may be prepared by mixing the components in any order. It will be understood that because micellar dispersions are thermodynamically stable, the water or polar component, non-polar component and surfactant component may be mixed in any order and minimal mixing is needed. Conveniently the aqueous or polar phase is mixed last into a mixture of the polar phase and surfactant.

Typically the micellar dispersion is prepared batchwise in tanks or other suitable vessels. In some situations the treatment fluid may be prepared "on the fly" by mixing the individual components on a continuous, preferably carefully controlled and monitored basis as the fluid is injected into the underground reservoir. Other methods of preparing the treatment fluid will be well known to those skilled in the art.

The micellar dispersion is conveniently introduced into the underground formation via injection or production wells. The wells may be vertical, deviated, inclined or horizontal. If being introduced into a newly drilled well, particularly if being used to remove damage caused during drilling, such as filter cakes, the treatment fluid may conveniently be introduced through the drill string using the mud pumps. The treatment fluid may also be introduced via coiled tubing or bullheading.

In some embodiments the micellar dispersion may be generated downhole, following the separate introduction of the individual components into the underground formation.

The low corrosivity of the fluid will generally permit introduction into wells or the drill string without the need to add corrosion inhibitors. The fluid will normally be introduced at below fracture pressure but may if desired be injected at above fracture pressure.

Where it is considered desirable, a pre-flush with suitable materials may be carried out ahead of the treatment with the micellar dispersion. Similarly, post-flushes with suitable materials may be carried out after treatment.

In one embodiment of the present invention, a volume of the micellar dispersion which is sufficient to allow the fluid to penetrate some distance, for example one to several meters, into a carbonate formation around a wellbore or behind a fracture face may be used. This can result in an increase in the matrix permeability of a carbonate formation to the desired depth in addition to and at the same time as removing damage from the near wellbore region or the fracture faces. In such cases a negative skin can result further increasing the productivity of the well beyond that which can be achieved with even complete near wellbore damage removal. The volume of fluid needed for such treatments will depend on the porosity of the formation, desired depth of penetration and dimensions of the wellbore, fracture or fracture network. Such an approach may also be effective for treating carbonate scaled sandstone reservoirs which also suffer from near wellbore damage, again using a single stage treatment.

For near wellbore treatments, the volume of treatment fluid introduced into the reservoir will typically be at least equal to the wellbore volume plus an allowance for some leak off into the formation. A fluid volume of between 120% and 200% of the wellbore volume will normally be used although if a high rate of fluid loss is expected a volume up to 300% or higher of the well bore volume may be selected. For treatments where the target is damage deeper into the formation such as in natural or induced fractures or fracture networks a volume will be selected appropriate to the requirements of the treatment.

The well will normally be shut in after introduction of the micellar dispersion for a period, typically between 0.5 hours and 24 hours (although longer or shorter treatment periods may also be used) to allow solubilisation of hydrocarbons, emulsions or water blocks and dissolution of acid soluble material by the acid produced from hydrolysis of the organic acid precursor. The well is then put on or returned to production, or in the case of injection wells, put on injection.

The micellar dispersions of the present invention may be used in a number of oilfield treatment situations including remediation of damage from asphaltenes, paraffins, scales, fines, heavy oil by-products, water blocks, drilling fluid, filter cakes, kill fluids, pipe dope, hydrocarbon emulsions, water based drill-in fluids or muds, oil based drill-in fluids and/or synthetic oil based drill-in fluids. They may also be used for stimulation and acidizing, including fracturing, propped fractures, and acid fracturing.

They are particularly applicable to situations where it is desirable to solubilise hydrocarbons or treat emulsions or water blocks, in combination with the controlled rate dissolution of acid-soluble material present in or adjacent to filter cakes or other damage in the underground formation, or where damage removal may usefully be combined with deep matrix stimulation of the formation surrounding a wellbore or induced or natural fracture.

In a preferred embodiment of the invention, the micellar dispersion is used to remove filter cakes arising from the use of water based drill-in fluids or muds, oil based drill-in fluids (invert emulsion drill-in fluids) or synthetic oil based drill-in fluids, where these contain calcium carbonate or other acid soluble materials as weighting materials and/or fluid loss agents.

The micellar dispersions of the present invention may be particularly useful for the cleanup of filter cake and other damage in openhole wells, in particular filter cake present in sand control completions including screens and gravel packs. They may also be used as gravel packing fluid.

Due to the very low interfacial tension typical of micellar dispersions, the micellar dispersions of the present invention may be particularly applicable to treatment of gas wells, where clean up will be facilitated.

It will be understood that removal of damage or dissolution of acid-soluble material using the process of the present invention may not be complete. The treatment may however be judged a success if damage is substantially remediated, resulting in higher rates of production or injection than would be the case with no treatment.

The process of the present invention has the following advantages over the prior art. It provides, within a single stage treatment, a simple and effective process for treating formation damage such as hydrocarbon, emulsion or water block within an underground reservoir where acid-soluble material may also be dissolved.

The micellar dispersions used in the process of the present invention are very simple to prepare and use.

Compared to other treatment processes where a separate "live" acid stage may be required, or where "live" acid is incorporated into a micellar dispersion to dissolve acid soluble material it is a very low hazard process for the controlled rate dissolution of acid soluble materials. Handling of "live" acid by operators is avoided and there is generally no need for high pressure, high rate injection which is often used in conventional acidizing processes to counter the high reaction rate of "live" acids.

In at least some embodiments, the process uses components which are highly acceptable from the environmental point of view for example, the method generally uses low toxicity, high flash point organic acid precursors The micellar dispersions are generally not highly corrosive, meaning that the use of corrosion inhibitors is generally not required Due to the good zonal coverage that can be obtained, the process of the present invention is particularly effective for the removal of filter cakes over long horizontal intervals and in sand control completions including gravel packs, stand alone and expandable screens. Uniform cleanup of filter cakes in such situations is critical in minimising the risk of premature failure.

The process of the present invention may also provide deep matrix acidizing of the formation around a wellbore or fracture at the same time as removing damage remediable by a micellar dispersion.

The invention will be further illustrated in the following Examples:

EXAMPLE 1

In order to confirm the presence of micelles in the micellar dispersions of the present invention, a number of exemplary dispersions were made up in filtered artificial sea water (Sigma sea salts Sigma Aldrich product number S-9883) using 10% v/v ORCA 1 or ORCA 2 (proprietary blends of surfactants commercially available from Cleansorb Limited) in combination with 10% v/v ORCA A, ORCA B or ORCA C (proprietary blends of carboxylic acid esters commercially available from Cleansorb Limited). Particle size analysis of the dispersions was carried out at 25° C. using a Malvern Zetasizer Nano ZS by laser light scattering.

The average particle (micelle) size of the dispersions is shown in Table 1.

TABLE 1

Average particle size and polydispersity index in examples of micellar dispersions

| Sample | Composition (in artificial sea water) | Z average Particle size (nm) | Polydispersity index |
|---|---|---|---|
| A | 10% v/v ORCA 2 plus 10% v/v ORCA A | 9.89 | 0.231 |
| B | 10% v/v ORCA 2 plus 10% v/v ORCA B | 11.49 | 0.241 |
| C | 10% v/v ORCA 2 plus 10% v/v ORCA C | 8.70 | 0.266 |
| D | 10% v/v ORCA 1 plus 10% v/v ORCA A | 10.12 | 0.265 |
| E | 10% v/v ORCA 1 plus 10% v/v ORCA B | 12.14 | 0.335 |
| F | 10% v/v ORCA 1 plus 10% v/v ORCA C | 23.87 | 0.214 |

All solutions were transparent and the analysis confirms that micelles were present in all of the dispersions.

EXAMPLE 2

To confirm the effectiveness of exemplary micellar dispersions for treating OBM filter cakes, filter cakes using 2 typical oil based field muds and one laboratory mud were made on 5 micron ceramic discs (2.5" diameter 0.25" thickness) in an HPHT cell.

The ceramic discs were first flooded by adding 100 ml of 4% KCl to the HPHT cell, pressurising to 100 p.s.i. with nitrogen gas and then opening the bottom valve to allow 50 ml of the 4% KCl solution to pass slowly through the ceramic disc in the injection direction. The bottom valve was then closed, the HPHT cell depressurised by opening the top valve and the solution above the ceramic disc was poured away. 25 ml of well-mixed oil based mud was then placed in the HPHT cell and the HPHT cell pressurised to 200 p.s.i. for 1 hour, with the bottom valve open. The bottom valve was then closed and the HPHT cell was depressurised by opening the top valve and the excess liquid mud above the filter cake on the ceramic disc was poured away.

The micellar dispersion (100 ml) was then placed in the HPHT cell, which was again pressurised to 200 p.s.i. and incubated at the formation temperature for the desired period of time. The bottom valve on the HPHT cell was then opened and the rate of escape of fluid from the cell measured. The bottom valve was then closed, the cell depressurised and the ceramic disc examined to determine how much (if any) filter cake remained and what constituents were present. The results are shown in Table 2.

TABLE 2

Treatment of oil based mud filter cakes with examples of micellar dispersions

| | Mud 1 Oil based field mud containing calcium carbonate | Mud 2 Oil based field mud containing calcium carbonate | Mud 3 Oil based lab mud containing polymeric fluid loss additive (no calcium carbonate in mud) | Mud 3 Oil based lab mud containing polymeric fluid loss additive (no calcium carbonate in mud) |
|---|---|---|---|---|
| Formation type | Sandstone | Sandstone | Carbonate | Carbonate |
| Initial fluid leak off during formation of filter cake (ml) | 3.0 | 2.8 | 6.0 | 6.0 |
| Micellar dispersion composition (made up in Sigma sea salts) | 10% v/v ORCA 2 plus 10% v/v ORCA B | 10% v/v ORCA 2 plus 10% v/v ORCA A | 10% v/v ORCA 1 plus 10% v/v ORCA A | 10% v/v ORCA 1 plus 10% v/v ORCA A |
| Formation/incubation temperature ° C. | 80 | 90 | 96 | 96 |
| Incubation period (hours) | 1 | 72 | 72 | 72 |
| Flow rate in injection direction when bottom valve opened following incubation (ml/min) | 120 | 102 | 126 | 120 |
| Ceramic disc appearance | Substantially dissolved filter cake - some mobile acid insoluble drill fines remaining | Substantially dissolved filter cake - some mobile acid insoluble drill fines and trace of undissolved carbonate remaining | Substantially dissolved filter cake - some mobile polymeric fluid loss additive and mobile excess added carbonate present on surface of ceramic disc | Substantially dissolved filter cake - some mobile polymeric fluid loss additive present on surface of ceramic disc |
| Presence of calcium carbonate on disc | None remaining | Trace remaining | Some (excess calcium carbonate was added) | Not applicable |
| Presence of polymeric fluid loss additive on disc | Not applicable | Not applicable | Present | Present |
| Final pH at room temperature (meter determination unless otherwise stated) | <2 (by pH dip stick) | 4.88 | 5.16* (*excess 50 micron calcium carbonate was added to the HPHT cell after filter cake formation to simulate treatment in a carbonate formation) | 2.86 (in absence of calcium carbonate) |

TABLE 2-continued

Treatment of oil based mud filter cakes with examples of micellar dispersions

|  | Mud 1<br>Oil based field<br>mud containing<br>calcium carbonate | Mud 2<br>Oil based field<br>mud containing<br>calcium carbonate | Mud 3<br>Oil based lab mud<br>containing polymeric fluid<br>loss additive (no calcium<br>carbonate in mud) | Mud 3<br>Oil based lab mud<br>containing polymeric fluid<br>loss additive (no calcium<br>carbonate in mud) |
|---|---|---|---|---|
| Other observations | Fluid remaining in HPHT cell appeared to be a single phase. | Fluid remaining in HPHT cell appeared to be a single phase. | Separate oil layer present in fluid remaining in HPHT cell | Separate oil layer present in fluid remaining in HPHT cell |

The results demonstrate that the micellar dispersions were capable of providing substantial cleanup of oil based mud filter cakes, including dissolution of any acid soluble material present, allowing high rates of fluid flow even in the injection direction.

EXAMPLE 3

To confirm the effectiveness of exemplary micellar dispersions at removing hydrocarbons from surfaces, a qualitative rotor test was used.

A fine mesh sleeve was placed around a standard Fann 35 Rheometer rotor. The weight of the clean dry rotor plus sleeve was determined. A 250 ml plastic beaker was filled with mud to 190 ml and the rotor placed in the beaker so that the mud reached the top of the gauze. The rotor was left in the mud for 30 seconds, then removed and transferred to a paper towel for a further 30 seconds to allow excess mud to drip off. The rotor was then weighed upside down. The rotor was then attached to a rheometer and immersed in the wash solution kept at room temperature. The rotational speed was set to 300 rpm. At regular intervals the rotor was removed from the test solution and weighed upside down. The percentage mud removed was then calculated for each time interval. The results from mud removal tests using three formulations are given in Tables 3 to 5.

TABLE 3

Mud removal by ORCA B 10% w/w + ORCA 1 10% w/w in 0.58M NaCl.

| Minutes | Weight (g) | Mud left | Mud Removed | % Removed |
|---|---|---|---|---|
| 0.5 | 828.00 | 1.00 | 2.25 | 69.2 |
| 1 | 827.82 | 0.82 | 2.43 | 74.8 |
| 2 | 827.45 | 0.45 | 2.80 | 86.2 |
| 3 | 827.20 | 0.20 | 3.05 | 93.8 |
| 4 | 827.20 | 0.20 | 3.05 | 93.8 |
| 5 | 827.20 | 0.20 | 3.05 | 93.8 |
| 7 | 827.17 | 0.17 | 3.08 | 94.8 |
| 10 | 827.17 | 0.17 | 3.08 | 94.8 |

Oil based mud 4, 22° C.

TABLE 4

Mud removal by ORCA B 10% w/w + ORCA 2 10% w/w in 0.58M NaCl.

| Minutes | Weight (g) | Mud left | Mud Removed | % Removed |
|---|---|---|---|---|
| 0.5 | 829.50 | 2.35 | 3.34 | 58.7 |
| 1 | 828.27 | 1.12 | 4.57 | 80.3 |
| 2 | 827.51 | 0.36 | 5.33 | 93.7 |
| 3 | 827.42 | 0.27 | 5.42 | 95.3 |
| 4 | 827.33 | 0.18 | 5.51 | 96.8 |
| 5 | 827.30 | 0.15 | 5.54 | 97.4 |
| 7 | 827.28 | 0.13 | 5.56 | 97.7 |
| 10 | 827.27 | 0.12 | 5.57 | 97.9 |

Oil based mud 4, 22° C.

TABLE 5

Mud removal by ORCA B 10% w/w + ORCA 3 10% w/w in 0.58M NaCl.

| Minutes | Weight (g) | Mud left | Mud Removed | % Removed |
|---|---|---|---|---|
| 0.5 | 829.00 | 1.85 | 3.20 | 63.4 |
| 1 | 828.15 | 1.00 | 4.05 | 80.2 |
| 2 | 827.56 | 0.41 | 4.64 | 91.9 |
| 3 | 827.37 | 0.22 | 4.83 | 95.6 |
| 4 | 827.34 | 0.19 | 4.86 | 96.2 |
| 5 | 827.29 | 0.14 | 4.91 | 97.2 |
| 7 | 827.29 | 0.14 | 4.91 | 97.2 |
| 10 | 827.28 | 0.13 | 4.92 | 97.4 |

Oil based mud 4, 22° C.

The invention claimed is:

1. A process for treating an underground formation, which process comprises:
   (a) introducing into the underground formation a micellar dispersion comprising water, one or more organic acid precursors, one or more surfactants and, optionally, one or more salts, co-surfactants and/or organic liquids that are not organic acid precursors; and
   (b) allowing (i) the micellar dispersion to solubilise hydrocarbons, emulsions or water blocks present in the underground formation, and (ii) at least a portion of the organic acid precursor to hydrolyse in-situ, thereby producing sufficient organic acid so that substantive dissolution occurs of acid soluble material present in or adjacent to filter cakes or other damage in the underground formation.

2. A process according to claim 1 wherein the micellar dispersion further comprises a catalyst to increase the rate of hydrolysis of the organic acid precursor.

3. A process according to claim 2 wherein the catalyst is an enzyme, a non-enzyme catalyst, a salt of a carboxylic acid or a surfactant.

4. A process according to claim 2 wherein the catalyst is an esterase, lipase or protease enzyme.

5. A process according to claim 2 wherein the catalyst is a metal ion, organic molecule or a combination of a metal ion and organic molecule.

6. A process according to claim 2 wherein the catalyst is a salt of a carboxylic acid.

7. A process according to claim 2 wherein the catalyst is stabilised or has its activity increased by use in a micellar dispersion compared to use in solution or emulsion.

8. A process according to claim 1 wherein the micellar dispersion is introduced into the underground formation via a wellbore which extends to a reservoir comprised in the formation.

9. A process according to claim 8 wherein the wellbore is vertical, deviated, inclined or horizontal.

10. A process according to claim 8 wherein the wellbore is shut in after introduction of the micellar dispersion for 0.5 to 24 hours.

11. A process according to claim 1 wherein the object of the treatment is the removal of a filter cake.

12. A process according to claim 11 wherein the filter cake is formed as a result of drilling with a water based, oil based or invert emulsion drill-in fluid or synthetic oil-based drill-in fluids.

13. A process according to claim 1 wherein the organic acid precursor is an ester, anhydride, orthoester, polyester or polyorthoester.

14. A process according to claim 1 wherein hydrolysis of the organic acid precursor produces formic acid, acetic acid, glycolic acid or lactic acid.

15. A process according to claim 1 wherein the micellar dispersion is water-external.

16. A process according to claim 1 wherein the micellar dispersion is oil-external.

17. A process according to claim 1 which comprises introducing the micellar dispersion into the underground formation via a drillstring.

18. A process according to claim 1 which comprises introducing the micellar dispersion into the underground formation via coiled tubing.

19. A process according to claim 1 which comprises introducing the micellar dispersion into the underground formation via bullheading of the fluid.

20. A process according to claim 1 which comprises introducing the micellar dispersion into the underground formation by injecting it at a rate below the reservoir fracture pressure.

21. A process according to claim 1 which comprises introducing the micellar dispersion into the underground formation by injecting it at a rate above the reservoir fracture pressure.

22. A process according to claim 1 wherein the object of the treatment is to increase the rate of production or rate of injection of wells drilled into the underground formation.

23. A process according to claim 1 wherein the object of the treatment is to substantially remove hydrocarbon, emulsion or water block damage in combination with dissolving acid soluble material present in or adjacent to filter cakes or other damage in the underground formation.

24. A process according to claim 1 wherein the filter cake is removed from a sand control completion.

25. A process according to claim 1 wherein the object of the treatment is to dissolve hydrocarbon or paraffin plus acid soluble material in scales.

* * * * *